United States Patent [19]

Lebby et al.

[11] Patent Number: 5,271,083
[45] Date of Patent: Dec. 14, 1993

[54] MOLDED OPTICAL WAVEGUIDE WITH CONTACTS UTILIZING LEADFRAMES AND METHOD OF MAKING SAME

[75] Inventors: Michael S. Lebby, Chandler; Davis H. Hartman, Phoenix; Shun-Meen Kuo, Chandler; Christopher K. Y. Chun, Mesa, all of Ariz.

[73] Assignee: Motorola, Inc., Schaumburg, Ill.

[21] Appl. No.: 920,073

[22] Filed: Jul. 27, 1992

[51] Int. Cl.⁵ .................. G02B 6/10; B29D 11/00
[52] U.S. Cl. .................. 385/130; 385/131; 385/132; 385/14; 385/141; 385/142; 385/144; 264/1.1; 264/1.7
[58] Field of Search .............. 385/1, 2, 8, 9, 14, 385/39, 40, 41, 49, 130, 131, 132, 92, 94, 141, 142, 143, 144, 145, 88, 89; 264/1.1, 1.5, 1.7, 2.5, 1.4; 257/666, 672, 676, 688, 689, 734, 773, 786, 788

[56] References Cited

U.S. PATENT DOCUMENTS

| | | | |
|---|---|---|---|
| 3,957,340 | 5/1976 | Giallorenzi | 385/2 X |
| 4,427,260 | 1/1984 | Puech et al. | 385/131 X |
| 4,693,543 | 9/1987 | Matsumura et al. | 385/130 X |
| 4,701,008 | 10/1987 | Richard et al. | 385/2 X |
| 4,714,312 | 12/1987 | Thaniyauarn | 385/14 X |
| 5,061,029 | 10/1991 | Ishikawa | 385/132 |
| 5,062,680 | 11/1991 | Imamura et al. | 385/131 |
| 5,067,829 | 11/1991 | Jaskie et al. | 385/8 |
| 5,113,471 | 5/1992 | Inaishi et al. | 385/49 X |
| 5,123,066 | 6/1992 | Acarlar | 385/14 |
| 5,163,118 | 11/1992 | Lorenzo et al. | 385/132 |

FOREIGN PATENT DOCUMENTS 64-70703  3/1989  Japan ................. 385/14 X

OTHER PUBLICATIONS

L. Blyler, Jr., G. J. Grimes, R. M. Lien, E. Ysebaert, A Molded Polymeric Resin-Filled Coupler, 41st Electronic Components & Technology Conference May 11-16, 1991 pp. 38 through 43.

L. Blyler, Jr., G. J. Grimes, R. M. Lien, E. Ysebaert, A Molded Polymeric Resin-Filled Coupler, IEEE Transaction on Components, Hybrids, and Manufacturing Technology, vol. 15, No. 4 Aug. 1992, pp. 505-509.

Primary Examiner—Brian Healy
Attorney, Agent, or Firm—Eugene A. Parsons

[57] ABSTRACT

A molded optical waveguide having electrical conductors molded therein for contacting an optical device mounted at one end of the waveguide and providing external electrical access to the optical device at exposed sides of the waveguide. The waveguide and assembled optical device is mounted on a printed circuit board or the like and contacted by lead wires.

21 Claims, 3 Drawing Sheets

MOLDED OPTICAL WAVEGUIDE WITH CONTACTS UTILIZING LEADFRAMES AND METHOD OF MAKING SAME

This invention relates, in general, to fabrication of optical devices and, more particularly, to connecting optical devices and optical waveguides together.

BACKGROUND OF THE INVENTION

At present, interconnection of an optical device and an optical waveguide is a difficult task that typically is achieved by use of hand methods or use of semiautomatic methods for interconnection or mating of the optical waveguide and the optical device. Generally, these methods are complex, inefficient, and not suitable for high volume manufacturing. A major problem associated with interconnection of optical devices to waveguides is a fabrication method and structure that will allow electrical and mechanical coupling between the optical device and the waveguide.

In the prior art, interconnection of the optical device and the waveguide typically is achieved by activating the optical device and carefully aligning, by hand, the optical device to the waveguide for the maximum coupling of light therebetween, commonly called active alignment, and subsequently cementing or adhering the optical device to the waveguide. However, many problems arise by aligning the optical device and the optical waveguide by hand, such as being extremely labor intensive, costly, inaccurate and/or inconsistent alignment, and the like. Further, curing of the adhesive that binds the optical device and the optical waveguide together often results in a shifting of the alignment of the optical device to the optical waveguide, thus causing a potentially inefficient transfer of light from the optical device. Moreover, if the misalignment is severe enough, unusable product is manufactured, thus increasing cost and reducing manufacturing capability.

Also, during connection of the optical device to the optical waveguide and during subsequent operation heat is generated which it is desirable to remove from the apparatus for a reliable interconnection and for reliable operation thereafter. In general, prior apparatus and methods of interconnecting optical devices to optical waveguides did not included a satisfactory means for dissipating heat generated during the interconnection and during subsequent operation.

It can readily be seen that conventional methods for connecting an optical device to a waveguide have severe limitations. Also, it is evident that the conventional processes that are used to fabricate the interconnection between the optical device and the waveguide are not only complex and expensive, but also not effective processes. Therefore, a method for making an interconnection between an optical device and an optical waveguide and the improved interconnection are highly desirable.

SUMMARY OF THE INVENTION

It is a purpose of the present invention to provide a new and improved optical waveguide with electrical contacts.

It is a further purpose of the present invention to provide a new and improved optical waveguide which is substantially simpler to manufacture and substantially simplifies assembly to optical devices.

These purposes and others as well as solutions to the above described problems are realized in an optical waveguide including a first cladding layer, a second cladding layer affixed in overlying relationship on the first cladding layer, a light conducting core positioned between the first and second cladding layers and substantially surrounded thereby, the core having first and second ends optically accessible at opposite ends of the waveguide, and a first electrical conductor formed in the first cladding layer with an externally accessible contact positioned in an end of the waveguide adjacent the first end of the core and an externally accessible portion positioned on an external surface of the first cladding layer.

These purposes and others as well as solutions to the above described problems are realized in a method of manufacturing an optical waveguide with electrical contacts including the steps of molding a first cladding layer with an inner surface and a first electrical conductor positioned in the first cladding layer, the first electrical conductor having an externally accessible contact positioned at an end of the first cladding layer and an externally accessible portion positioned on an external surface of the first cladding layer, molding a second cladding layer with a channel in an inner surface thereof, and affixing the inner surface of the first cladding layer in overlying relationship on the inner surface of the second cladding layer so as to form a light conducting core positioned between the first and second cladding layers and substantially surrounded thereby, the core having first and second ends optically accessible at opposite ends of the waveguide with the first end being positioned adjacent the externally accessible contact of the first electrical conductor.

BRIEF DESCRIPTION OF THE DRAWINGS

Referring to the drawings.

DESCRIPTION OF THE PREFERRED EMBODIMENT

Figure 1:
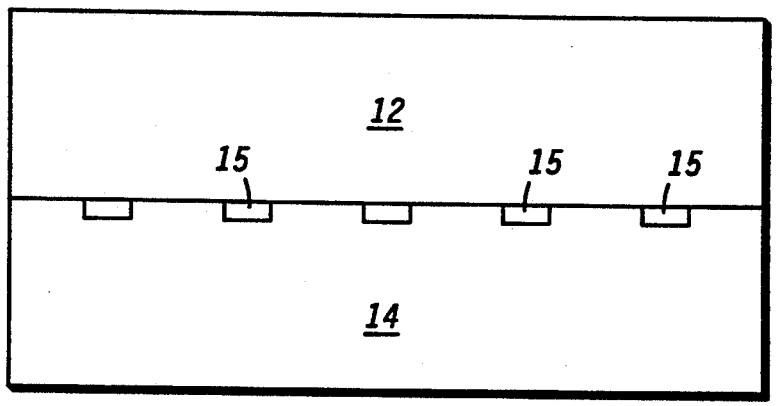
FIG. 1 is a view in end elevation of a molded optical waveguide.

FIG. 1 is an end elevational view of a molded waveguide 10. Molded waveguide 10 is made of first cladding layer 12, second cladding layer 14, and cores 15. Second cladding layer 14 is molded with axially extending channels in the inner surface thereof, which channels are designed to receive unprocessed core material therein. Typically, the inner surfaces of molded first cladding layer 12 and molded second cladding layer 14 are joined by an optically transparent material which forms cores 15 of waveguide 10 and acts as an adhesive and an optically transparent polymer. The optically transparent material generally may be any of several materials, such as epoxies, plastics, polyimides, or the like. Generally, refractive indexes of these optically transparent materials range from 1.54 to 1.58. It should be understood that to form an optical waveguide the refractive index of cores 15 should be at least 0.01 greater than the refractive index of cladding layers 12 and 14.

In this specific embodiment of molded waveguide 10, epoxy is used to join the inner surface of first cladding layer 12 to the inner surface of second cladding layer 14. Application of the epoxy is done in a manner so as to completely fill the channels of first cladding layer 12, thereby forming cores 15. Further, by having cores 15 completely surrounded by cladding layers 12 and 14, cores 15 have superior performance characteristics for conducting light or light signals. These superior performance characteristics are used in enhancing high speed communications applications, such as chip-to-chip communications, board-to-chip communications, board-to-board communications, computer-to-computer communications, and the like. Additionally, a capability is available, in molded waveguide 10, to match refractive indexes of cladding layers 12 and 14.

Typically, the epoxy may be cured by a variety of methods, such as air drying, exposure to UV light, heat treating, or the like. Selection of specific curing methods is application specific as well as being dependent upon selection of the adhesive and the cladding materials that are used for making first and second cladding layers 12 and 14.

By way of example only, first cladding layer 12 and second cladding layer 14 are made by injecting a transparent epoxy molding compound, available under the Tradename HYSOL MG18 from Dexter Corporation, into molds (not shown) provided for the purpose. Temperature of the molds range between 150° C. to 175° C. with a preferred temperature range from 160 degrees Celsius to 165 degrees Celsius. Molding pressure of the molds range between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C.

Upon completion of the curing time, first cladding layer 12 and second cladding layer 14 are removed from the molds. Typically, a post-curing step is necessary in order to achieve maximum physical and electrical properties of the HYSOL material. This step generally proceeds at 150 degrees Celsius for approximately 2 to 4 hours. Completion of the post-cure step results in first cladding layer 12 and second cladding layer 14 having a refractive index of approximately 1.52.

Once the molding and curing processes, as well as the removal of the first and second cladding layers 12 and 14 from their respective molds have been completed, the first and second cladding layers 12 and 14 are ready to be assembled. Assembly is achieved by applying, to the inner surface of one of the cladding layers, an optically clear adhesive with a refractive index at least 0.01 higher than the material forming the first and second cladding layers 12 and 14. In this specific embodiment, this is accomplished by applying an optically clear epoxy available under a Tradename EPO-TEK 301-2 from EPOXY TECHNOLOGY INC. Typically, after the adhesive is applied to the inner surface of first cladding layer 12, the inner surface of second cladding layer 14 is compressed against the inner surface of first cladding layer 12, thereby squeezing and filling the channels and adhering both first cladding layer 12 and second cladding layer 14 together.

Curing times for the adhesive epoxy is dependent upon temperature, e.g., at room temperature curing time is 2 days and at 80 degrees Celsius curing time is 1.5 hours. Additional information as to the molding and construction of molded waveguide 10 is available in copending U.S. patent application entitled "Molded waveguide and method for Making Same", Ser. No. 07/889,335, filed May 28, 1992 and assigned to the same assignee.

Figure 2:
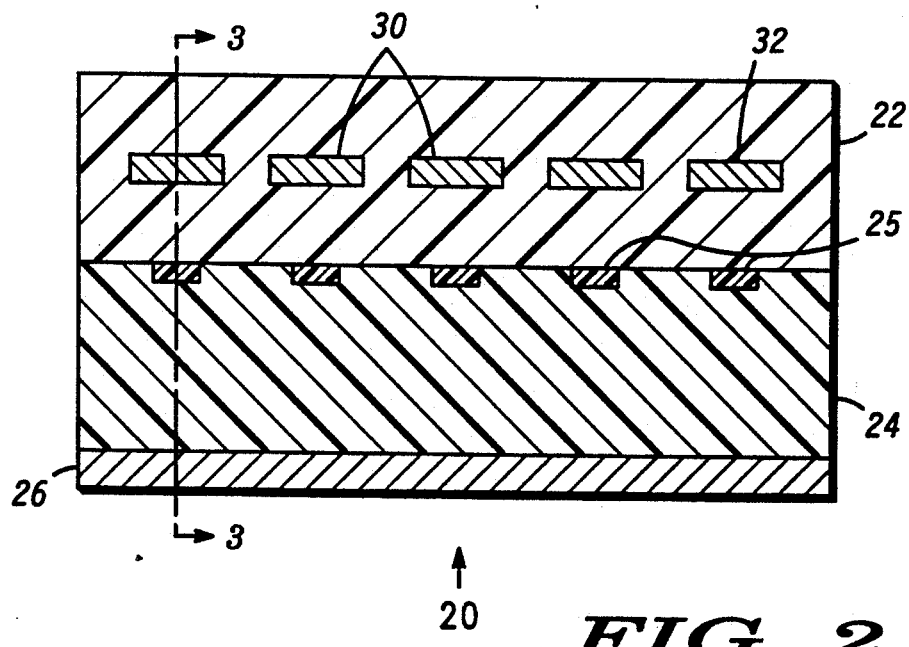
FIG. 2 is a cross-sectional view of a molded optical waveguide with electrical connections incorporated therein embodying the present invention.
Figure 3:
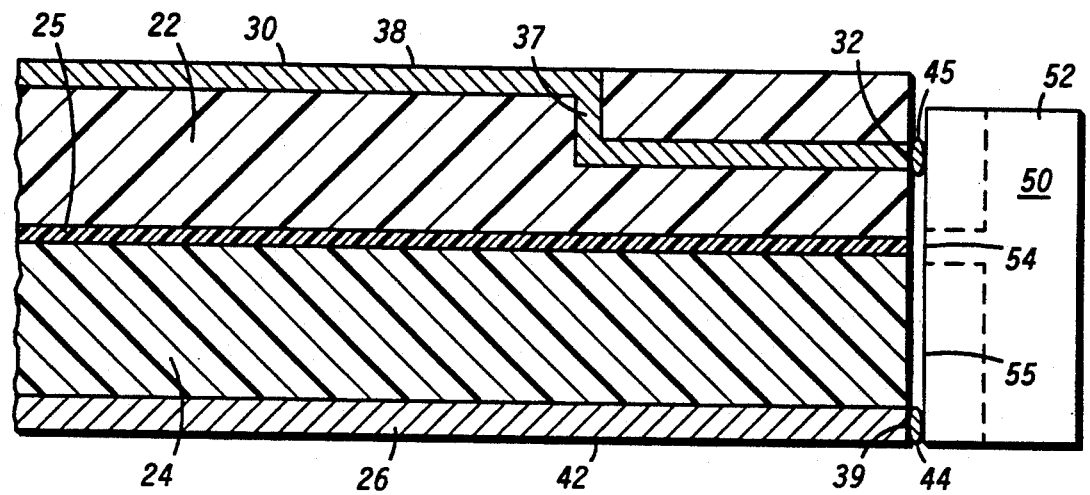
FIG. 3 is a sectional view as seen from the line 3—3 of FIG. 2, with an optical device electrically and optically connected thereto.
Figure 4:
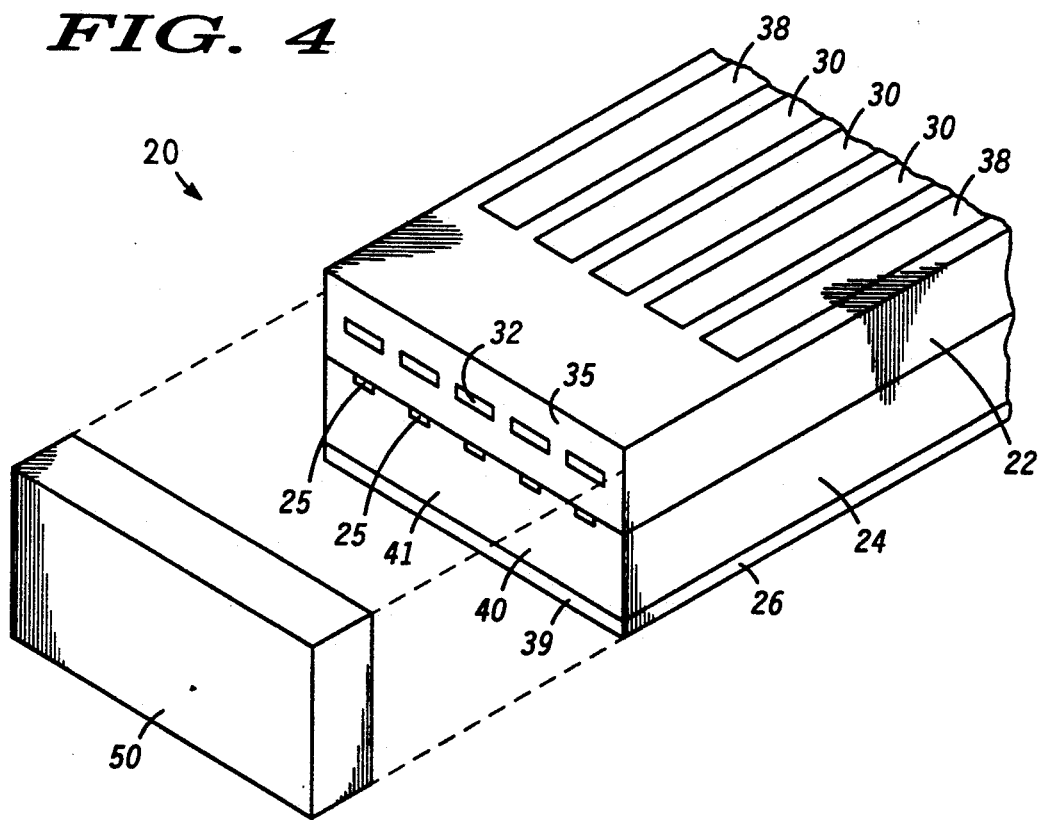
FIG. 4 is an exploded view in perspective of the molded optical waveguide and optical device of FIG. 3.

Referring specifically to FIGS. 2, 3 and 4, a molded optical waveguide 20 with electrical connections incorporated therein is illustrated. Optical waveguide 20 includes a first cladding layer 22 and a second cladding layer 24 with cores 25 positioned therebetween, generally as described above. In addition, second cladding layer 24 has a ground plane, or ground conductor, 26 affixed to the lower surface thereof. Also, a plurality of electrical conductors 30, in this embodiment one for each core 25, are molded into first cladding layer 22. Electrical conductors 30 are, for example, provided in the form of a flexible leadframe, which leadframes are well known in the semiconductor art. Ground conductor 26 and conductors 30 are formed of any convenient electrically conducting material, such as copper, aluminum, gold, silver, etc.

As can be seen especially in FIGS. 3 and 4, electrical conductors 30 are molded into first cladding layer 22 and each have a first end forming an electrically accessible contact 32 in end 35 of molded optical waveguide 20. Electrical conductors 30 extend into the bulk of first cladding layer 22 and are bent at 37 with two generally ninety degree bends so that a portion 38 of each electrical conductor 30 lies in the upper surface of first cladding layer 22 and is available for external electrical connections thereto. The position of portion 38 in the upper surface of first cladding layer 22 depends upon the specific application and the position and type of external electrical connections to be made.

Ground conductor 26 is a layer of electrically conducting material such as copper, aluminum, gold, silver, etc. Ground conductor 26 may be molded into, or along with, cladding layer 24, or it may be deposited on cladding layer 24 after the formation thereof. Further, while the ground conductor 26 is referred to as a ground plane in this specific embodiment it will be understood by those skilled in the art that in some special applications ground conductor 26 may be molded into second cladding layer 24 and may include a plurality of individual conductors similar to electrical conductors 30. In either case, ground conductor 26 generally includes an externally accessible electrical contact 39 positioned in an end 40 of second cladding layer 24, which end 40 lies in a plane with end 35 of first cladding layer 22, both of which define a first end 41 of optical waveguide 20. Also, ground conductor 26 generally includes an externally accessible electrical portion 42 lying in an external surface of second cladding layer 24.

Referring to FIGS. 3 and 4, an optical array 50 is illustrated affixed to first end 41 of optical waveguide 20, which optical array 50 includes at least one optical device. In this specific embodiment optical array 50 contains five optical devices 52. Optical devices 52 can be any of the devices known in the art which detect or generate light, or any combination thereof, such as light detecting diodes, light emitting diodes, vertical cavity surface emitting lasers, any of the other known lasers, field emission devices, etc. Each optical device 52 includes an optical input/output 54 positioned in a surface 55 of optical array 50. Each of the optical input/outputs 54 is aligned with a different one of the cores 25 so that light travelling down aligned core 25 enters input/output 54 of optical device 52 or light generated by optical device 52 leaves input/output 54, enters aligned core 25 and is conducted thereby to the opposite end.

Each optical device 52 has a pair of spaced apart electrical terminals positioned in surface 55 of optical array 50 so that one of the terminals connects to contact 32 adjacent, or associated with, aligned core 25 and the other terminal connects to contact 39 of ground conductor 26. The electrical terminals of each optical device 52 are connected to the contacts 32 and 39 adjacent to, or associated with, the aligned core 25 at 44 and 45 (see FIG. 3) by means of a weld or reflowable connection material such as conductive epoxy, solder, solder paste, etc. Generally, since electrical conductors 30 are molded into cladding layer 22 and ground conductor 26 is molded into, or deposited on the surface of, cladding layer 24 the positioning of contacts 32 and 39 is sufficiently accurate to allow satisfactory alignment of optical input/outputs 54 with cores 25 by simply affixing the pair of terminals of each optical device 52 to contacts 32 and 39. The affixing can be performed manually or with any of the robotics presently available for assembly purposes.

Once optical array 50 is physically and electrically affixed to optical waveguide 20 the entire assembly can be, for example, surface mounted on a printed circuit board or could be included in a hybrid package with semiconductor chips and the like. Electrical connections to optical devices 52 are made by some convenient means such as wire bonding between externally accessible portions 38 and contacts, or bonding pads, on the printed circuit board, etc. In general a single contact to ground conductor 26 provides a connection to the opposite side of all of optical devices 52.

It should be noted that, in addition to providing electrical contacts for optical waveguide 20, electrical conductors 30 and ground plane 26 act as a heat sink to conduct heat from optical array 50 during assembly and operation. The cross-sectional dimensions and length of electrical conductors 30 and ground conductors 26, as well as the length of portion 38 of electrical conductors 30 and portion 42 of ground conductor 26, can be chosen to carry more or less heat, depending upon the application. Also during the original assembly, external heat sinks can be placed in contact with portions 38 and 42 to further remove the heat of reflowing or welding.

For high speed electronic signal operation through the leadframe, the length of the electronic conductors must be addressed, depending upon the speed of the signal. In such applications the length of the electrical conductors may be less than the length of the molded cladding layers, or the electrical conductors and molded cladding layer can simply be shortened to some acceptable length. For example, the length of the electrical conductors may be approximately the same as the height (distance from the core to the external surface) of the cladding layer. In such applications it may be convenient to utilize smaller electrical conductors, perhaps in the range of one to two mills. Also, in some applications it may be desireable to reduce inductance, in these instances the electrical conductors can be formed with a greater cross-section.

Figure 5:
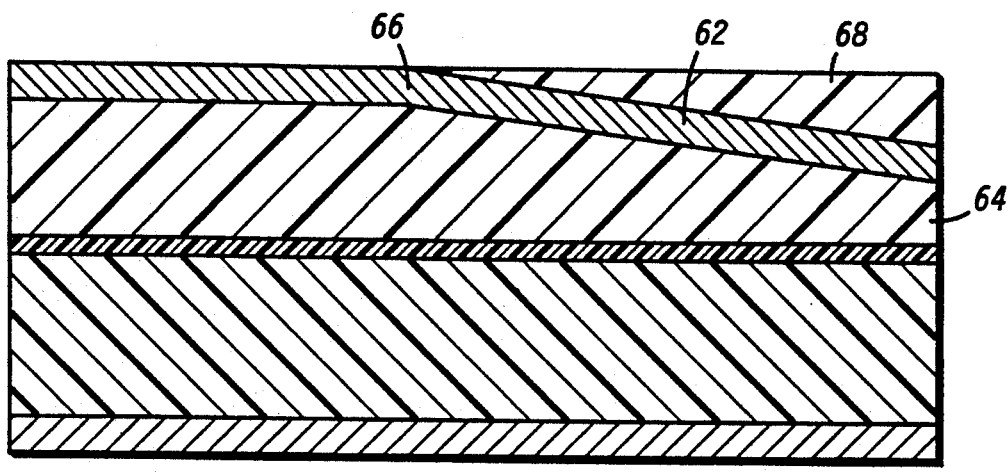
FIG. 5 is a sectional view similar to FIG. 3 of another embodiment of a molded optical waveguide.

Referring specifically to FIG. 5. a sectional view of another embodiment 60 of a molded waveguide with electrical contacts is illustrated. In this embodiment electrical conductors 62 are molded into a first cladding layer 64 similar to the above description. However, in this embodiment electrical conductors 62 are bent continuously, starting at an area designated 66 and continuing to an end 68 of cladding layer 64. This particular embodiment is useful in applications where the two ninety degree bends of the embodiment illustrated in FIGS. 2-4 would place too much stress on electrical conductors 62. It will of course be understood by those skilled in the art that any variety and shape of electrical conductors can be utilized in the disclosed optical waveguide, depending upon the materials utilized and the application of the optical waveguide.

Figure 6:
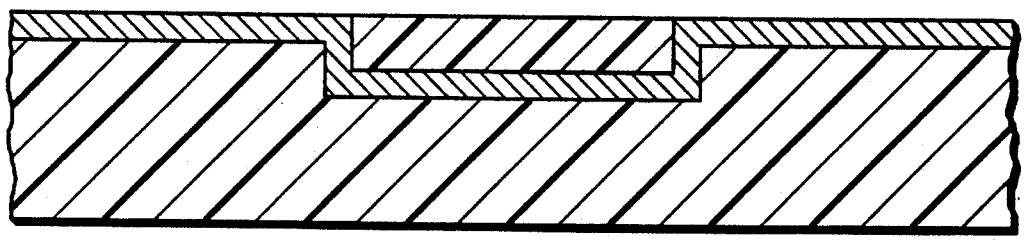
FIG. 6 is a sectional view of an intermediate step in one method of the formation of the molded optical waveguide of FIG. 2.

FIG. 6 illustrates, in sectional view, an intermediate step in one method of the formation of the molded optical waveguide of FIG. 2. By utilizing this method two molded cladding layers are formed simultaneously from a single piece of leadframe. This particular formation process provides stress balance for the leadframe folds, as well as keeping the spacing between the conductors accurate and constant. After the leadframe is molded into the cladding layer the cladding layer is cut, by a saw or similar device, at the arrow designated "cut".

Figure 7:
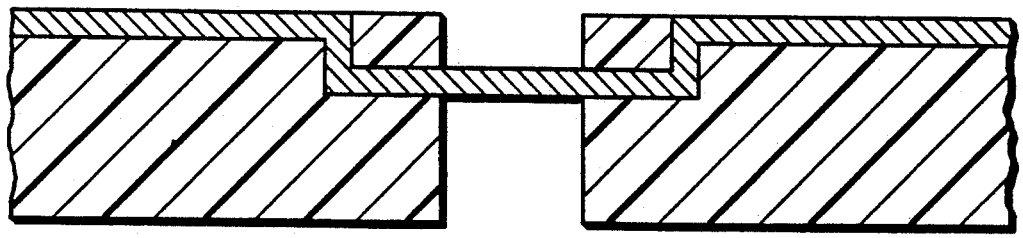
FIG. 7 is a sectional view of an intermediate step in another method of the formation of the molded optical waveguide of FIG. 2.

FIG. 7 is a sectional view of an intermediate step in another method of the formation of the molded optical waveguide of FIG. 2. In this method a single leadframe is again folded, or bent, at two spaced apart points. The leadframe is then molded into two separate cladding layers, for example in two separate molds. The two cladding layers are then separated by simply cutting the leadframe at the two arrows designated "cut".

Thus, new and improved molded optical waveguides with electrical connections are disclosed which are much simpler and more accurate to manufacture and which substantially simplify later assembly with optical devices. Because the electrical connections are molded into the waveguides at the time the waveguides are formed, the contacts are much more accurately and simply positioned. Also, because the electrical contacts are accurately positioned, subsequent assembly steps can be performed by machines (robots and the like) which rely on the electrical contacts rather than optical alignment of the optical device and the core of the waveguide. Further, the disclosed optical waveguides provide heat sinks to reduce damage during assembly and to improve reliability and efficiency of operation.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. An optical waveguide for optionally and electrically receiving an optical device at a fist end of the waveguide and for coupling light between an input/output of the optical device and a second end of the waveguide, the optical waveguide comprising:

a first cladding layer;

a second cladding layer affixed in overlying relationship on the first cladding layer;

a light conducting core positioned between the first and second cladding layers and substantially surrounded thereby, the core having first and second ends optically accessible at first and second ends of the waveguide, respectively; and a first electrical conductor formed in the first cladding layer with an externally accessible contact positioned in the first end of the waveguide adjacent the first end of the core and an externally accessible portion positioned on an external surface of the fist cladding layer, the externally accessible contact being further positioned to electrically engage an electrical terminal of an optical device positioned with an input/output of the optical device optically aligned with the first end of the core and the externally accessible portion being positioned to provide an external electrical connection to the terminal of the optical device with the optical device mounted on the first end of the waveguide.

2. An optical waveguide as claimed in claim 1 including in addition a second electrical conductor formed in the second cladding layer with an externally accessible contact positioned in the end of the waveguide adjacent the first end of the core and an externally accessible portion positioned on an external surface of the second cladding layer.

3. An optical waveguide as claimed in claim 2 wherein a first portion of the first electrical conductor adjacent the externally accessible contact is embedded in the first cladding layer and the first electrical conductor includes a bend therein extending from the first portion to the externally accessible portion.

4. An optical waveguide as claimed in claim 3 wherein the bend includes at least one substantially perpendicular angle.

5. An optical waveguide as claimed in claim 4 wherein the bend includes two substantially perpendicular angles oriented in opposite directions.

6. An optical waveguide as claimed in claim 2 wherein the second electrical conductor is a ground plane affixed to the external surface of the second cladding layer and extending to the end of the waveguide.

7. An optical waveguide as claimed in claim 1 wherein the optical waveguide includes a plurality of cores and a plurality of first electrical conductors, one for each core.

8. An optical waveguide as claimed in claim 7 wherein the plurality of first electrical conductors is a flexible leadframe.

9. An optical waveguide as claimed in claim 8 wherein the leadframe includes electrical conductors formed of copper.

10. An optical device with connected optical waveguide comprising:

an optical device having an optical input/output and an electrical terminal positioned on a first surface thereof;

an optical waveguide including a first cladding layer, a second cladding layer affixed in overlying relationship on the fist cladding layer, a light conducting core positioned between the first and second cladding layers and substantially surrounded thereby, the core having first and second ends optically accessible at opposite ends of the waveguide, an electrical conductor formed in the first cladding layer with an externally accessible contact positioned in an end of the waveguide adjacent the first end of the core and an externally accessible portion positioned on an external surface of the first cladding layer, the externally accessible portion being positioned to provide an external electrical connection to the electrical terminal of the optical device with the optical device mounted on the first end of the waveguide and the optical input/output optically aligned with the first end of the core; and means affixing the optical device to the end of the waveguide with the optical input/output substantially aligned with the first end of the core and the electrical terminal in electrical contact with the externally accessible contact.

11. An optical device with connected optical waveguide as claimed in claim 10 wherein the means affixing the optical device to the end of the waveguide includes solder.

12. An optical device with connected optical waveguide as claimed in claim 11 wherein the solder is in the form of a reflowable ball.

13. An optical device with connected optical waveguide as claimed in claim 10 wherein the means affixing the optical device to the end of the waveguide includes conductive epoxy.

14. An optical device with connected optical waveguide as claimed in claim 10 wherein the optical device includes a vertical cavity surface emitting laser.

15. An optical device with connected optical waveguide as claimed in claim 10 wherein the waveguide includes a plurality of cores and the optical device includes a plurality of vertical cavity surface emitting lasers each having an optical input/output each aligned with a different one of the plurality of cores.

16. An optical device with connected optical waveguide as claimed in claim 10 including in addition a second electrical conductor formed in the second cladding layer with an externally accessible contact positioned in the end of the waveguide adjacent the first end of the core and an externally accessible portion positioned on an external surface of the second cladding layer and the optical device includes a second electrical terminal positioned on the first surface thereof and the second electrical terminal positioned in electrical contact with the externally accessible contact of the second electrical conductor.

17. A method of manufacturing an optical waveguide with electrical contacts comprising the steps of:

molding a first cladding layer with an inner surface and a first electrical conductor positioned in the first cladding layer, the first electrical conductor having an externally accessible contact positioned at an end of the first cladding layer and an externally accessible portion positioned on an external surface of the first cladding layer;

molding a second cladding layer with a channel in an inner surface thereof; and affixing the inner surface of the first cladding layer in overlying relationship on the inner surface of the second cladding layer so as to form a light conducting core positioned between the first and second cladding layers and substantially surrounded thereby, the core having first and second ends optically accessible at opposite ends of the waveguide with the first end being positioned adjacent the externally accessible contact of the first electrical conductor.

18. A method of manufacturing an optical waveguide with electrical contacts as claimed in claim 17 wherein the step of molding a second cladding layer includes in addition positioning a second electrical conductor in the second cladding layer with an externally accessible contact positioned in the end of the waveguide adjacent the first end of the core and an externally accessible portion positioned on an external surface of the second cladding layer.

19. A method of manufacturing an optical waveguide with electrical contacts as claimed in claim 18 wherein positioning a second electrical conductor in the second cladding layer includes positioning a layer of electrically conducting material along a portion of the external surface of the second cladding layer, which layer of electrically conducting material forms the externally accessible contact positioned in the end of the waveguide and the externally accessible portion positioned on the external surface of the second cladding layer.

20. A method of manufacturing an optical waveguide with electrical contacts as claimed in claim 18 including in addition the steps of providing an optical device having an optical input/output and a pair of spaced apart electrical terminals positioned on a first surface thereof, and affixing the optical device to the end of the waveguide with the optical input/output substantially aligned with the first end of the core and each of the electrical terminals being in electrical contact with a different one of the externally accessible contacts in the first and second cladding layers.

21. A method of manufacturing an optical waveguide with electrical contacts as claimed in claim 20 wherein the step of providing an optical device includes providing a vertical cavity surface emitting laser.

* * * * *

UNITED STATES PATENT AND TRADEMARK OFFICE
CERTIFICATE OF CORRECTION

PATENT NO. : 5,271,083
DATED : December 14, 1993
INVENTOR(S) : Lebby et al.

It is certified that error appears in the above-indentified patent and that said Letters Patent is hereby corrected as shown below:

Column 6, claim 1, line 63, delete "optionally" and insert "optically" following the word "for".

Column 6, claim 1, line 64, delete "fist" and insert "first" before the word "end".

Column 7, claim 1, line 13, delete "fist" and insert "first" before the word "cladding".

Column 7, claim 10, line 63, delete "fist" and insert "first" before the word "cladding".

Signed and Sealed this

Eighteenth Day of October, 1994

Attest:

BRUCE LEHMAN

*Attesting Officer*  *Commissioner of Patents and Trademarks*